Jan. 11, 1944.  M. LUCKIESH  2,339,085
REFRIGERATOR
Filed April 10, 1943
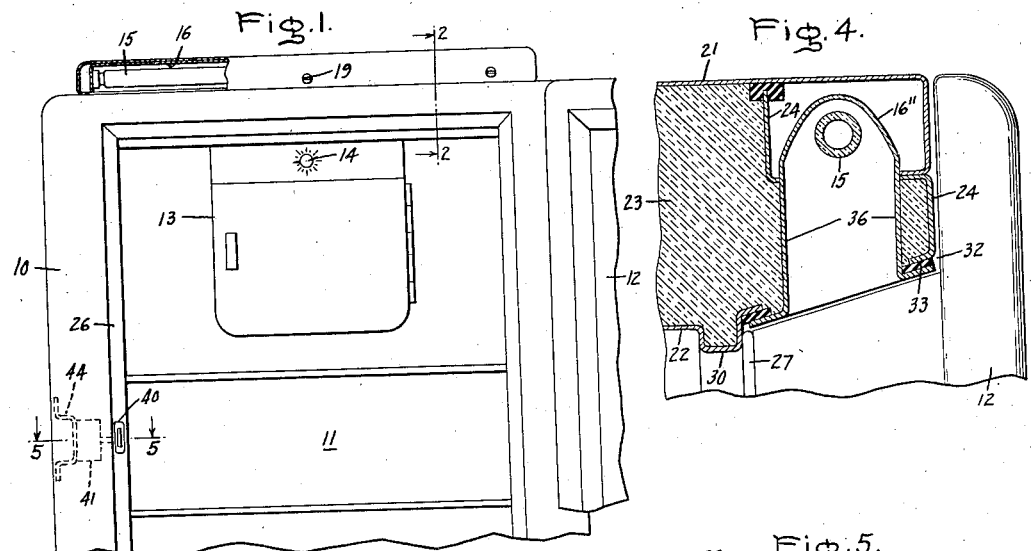
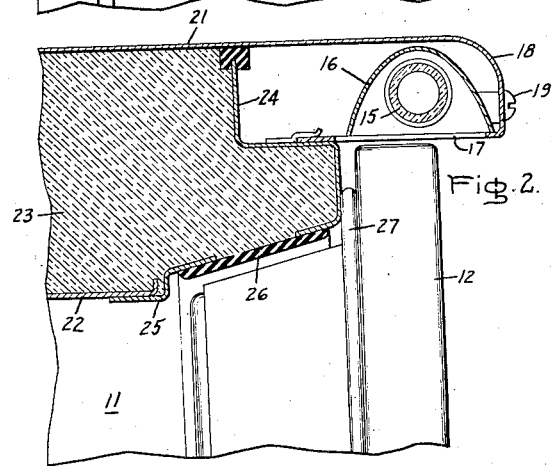
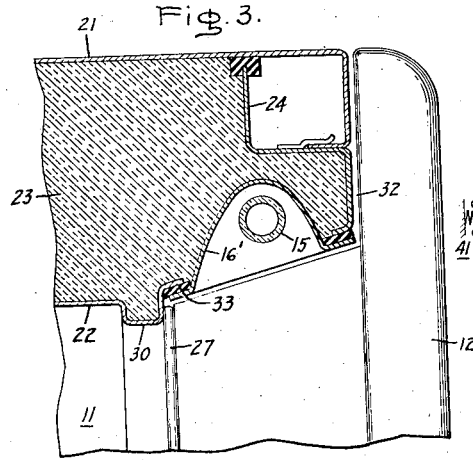
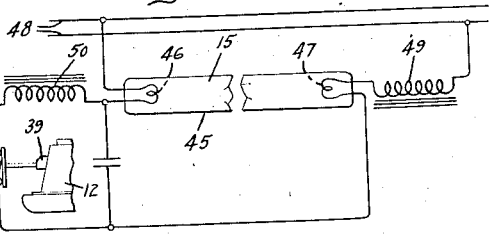
Inventor:
Matthew Luckiesh,
by Harry E. Dunham
His Attorney.

Patented Jan. 11, 1944

2,339,085

UNITED STATES PATENT OFFICE 2,339,085

REFRIGERATOR

Matthew Luckiesh, Shaker Heights, Ohio, assignor to General Electric Company, a corporation of New York Application April 10, 1943, Serial No. 482,601

8 Claims. (Cl. 62—89)

My invention relates to refrigerators and particularly to arrangements for minimizing the presence of bacteria within the food storage compartment of a refrigerator.

Refrigerators, such as those employed for household use, are commonly provided with a cooling unit capable of maintaining a temperature in the food storage compartment sufficiently low to prevent or minimize the growth of bacteria in foods placed within the compartment. Many of the bacteria which are responsible for the spoiling of foods are air-borne, and since there is an exchange of air between the food compartment and the room whenever the door of the refrigerator is opened, additional bacteria may enter the compartment whenever the door is opened. The temperature normally prevailing in a refrigerator is not sufficient to kill bacteria but merely inhibits the growth thereof, and heretofore, it has been proposed to provide within the food storage compartment a source of germicidal rays such as an ultraviolet lamp. The lamp may be energized upon shutting the door and in some cases, may be energized periodically while the door is closed. It is difficult to treat with these lamps all areas within the food compartment since the dishes and articles of food on the shelves prevent the ultraviolet rays from reaching all parts of the compartment, and even from reaching all the air in the compartment, in spite of the circulation due to the thermal currents. The passage of bacteria between the several articles of food within the compartment is minimized by maintaining low temperatures, however, if more bacteria are admitted periodically, there is danger that the bacteria will reach all the food in the compartment.

It is an object of my invention to provide a refrigerator including an improved arrangement for minimizing or inhibiting the growth of bacteria therein.

It is another object of my invention to provide an improved refrigerator including an arrangement for preventing or minimizing the addition of air-borne bacteria to the air within the refrigerator when the door is opened.

A further object of my invention is to provide a refrigerator having an arrangement for projecting a screen of ultraviolet radiation across the door opening whenever the door is opened and for insuring high germicidal efficiency of the screen.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a front elevation of an upper portion of a refrigerator embodying my invention; Fig. 2 is an enlarged sectional view on the line 2—2 of Fig. 1; Figs. 3 and 4 are views similar to Fig. 2 showing modifications of my invention; Fig. 5 is an enlarged sectional view on the line 5—5 of Fig. 1; and Fig. 6 is a schematic diagram of the circuit employed for the ultraviolet lamp shown in Figs. 1 to 4, inclusive.

Briefly, the refrigerator illustrated in the drawing comprises a thermally insulated cabinet providing a food compartment in which is arranged an evaporator or cooling unit for maintaining the temperature within the compartment sufficiently low to minimize the growth of bacteria, and thereby preserve food placed therein. In order to kill bacteria which might be carried into the food compartment upon opening the door, an ultraviolet lamp is arranged adjacent the door opening in such a manner as to project a screen of germicidal rays across the door opening and kill any bacteria in the entering air. The circuit of the ultraviolet lamp includes a switch which operates to energize the lamp upon the initial movement of the refrigerator door latching mechanism so that the germicidal screen is established before the door is moved and is projected across the opening instantaneously as the door is moved away from the opening. In order that the lamp may have as high a germicidal efficiency as possible, it is located outside the food storage compartment so that it is not cooled to the temperature of the food compartment; and to further increase the germicidal efficiency, an arrangement may be provided to maintain the cathodes of the lamp heated while the lamp is not in operation.

Referring now to the drawing, the refrigerator shown in Fig. 1 comprises a cabinet 10 having a food compartment 11 and a door 12 for closing the opening to the food compartment. The cabinet is provided with thermal insulation surrounding the food compartment and the door is also thermally insulated. In order to cool the food compartment 11 and inhibit the growth of bacteria therein, an evaporator or cooling unit 13 is arranged in the upper portion of the compartment. The evaporator is supplied with refrigerant from a suitable refrigerating machine (not shown) in accordance with common practice, and the temperature of the evaporator may be regulated by the setting of a control knob 14 in the usual manner. When the door 12 is opened, the cool air within the food compartment spills out and is replaced by warm air from the room which may contain air-borne bacteria, and in order to prevent the bacteria in the air of the room from entering the food compartment, an ultraviolet lamp 15 is mounted on the outside of the food compartment above the door opening and is provided with a reflector 16 for directing a screen of germicidal radiation across the door opening so that any air entering the compartment must pass through the screen, bacteria in the air being killed thereby. As shown in Fig. 2, the reflector 16 is mounted within an opening 17 in an overhanging portion 18 of the top wall in the refrigerator cabinet, the reflector being held in place by screws 19. The reflector 16 is preferably of parabolic cross section so that rays reflected therefrom are projected vertically and downwardly across the door opening. Since the opening 17 provides communication between the interior of the reflector 16 and the air surrounding the refrigerator, the lamp 15 is maintained at nearly room temperature. The lamp is arranged at the top in the preferred embodiment of the invention since this places the lamp nearest to the incoming air, it being obvious that the cold air spills out at the lower portion of the opening while the warm room air enters at the upper portion.

As shown in Fig. 2, the cabinet 10 comprises an outer metal shell 21 and an inner metal shell 22, the shells being spaced apart and a mass of thermal insulation 23 being located between them. The outer shell 21 is provided with an extension 24 between the top of the cabinet and the door opening, and the shell 22 is provided with an extension 25 arranged about the door opening and welded or otherwise suitably secured to the shell 22. The extensions 24 and 25 are spaced apart about the door opening and are connected by a breaker strip 26 of suitable thermal insulating material. The door 12, when in its closed position, as shown in Fig. 2, seals the door opening by pressing a flexible gasket 27 of rubber or other suitable material against the outer shell portion 24. The circuit of the ultraviolet lamp 15 is arranged, in a manner to be described, so that the lamp is energized to project its screen of ultraviolet radiation across the door opening instantaneously whenever the door is opened.

The embodiment of the invention shown in Fig. 3 is similar to that shown in Fig. 2 and corresponding parts have been designated by the same numerals. The door 12, as shown in Fig. 3, is arranged to extend to the top of the refrigerator, and the gasket 27 instead of being pressed between the outer wall of the refrigerator and the door is pressed between the inner wall of the door and a shoulder 30 formed on the inner shell 22 about the door opening. The insulated breaker strip 26 of Fig. 2 is omitted along the top side of the door opening; and a reflector 16', is mounted in a recess formed in the wall of the cabinet above the door opening, the germicidal lamp 15 being located within the reflector 16'. Since the gasket 27 prevents passage of cold air from the compartment 11 into the recess formed by the reflector 16' and around the lamp 15, the lamp is, therefore, maintained at a temperature higher than that of the food compartment. The lamp is also in communication with the outside air through a space 32 between the door and the cabinet walls. The reflector 16' is secured to the inner wall 22 and to the outer wall portion 24 with suitable insulating strips 33 between the reflector and the walls to minimize the conduction of heat from the outer wall to the inner wall.

The construction shown in Fig. 4 is similar to that shown in Fig. 3, and corresponding parts have been designated by the same numerals. The arrangement of Fig. 4 differs from that of Fig. 3 in that the lamp 15 is arranged within a reflector 16" having vertical walls 36 providing a deep recess such that very little of the radiation from the lamp 15 can pass out through the door opening. This minimizes the passage of direct rays of the lamp outwardly from the door opening so that the person opening the door will not look at the lamp unintentionally, and his eyes are protected from the ultraviolet rays.

The reflectors 16, 16' and 16" are all provided with parabolic portions so that a screen of approximately parallel rays will be reflected vertically across the door opening. The reflectors are preferably made of some material such as aluminum which has good reflecting properties for ultraviolet rays.

In order to insure the presence of the germicidal screen when the door is opened, I provide an arrangement so that the lamp is energized upon the initial movement of the door latch mechanism before the door is moved toward its opened position. The latch mechanism, as shown in Fig. 5, includes an operating handle 38 on the outside of the door and a bolt 39 arranged to engage a strike 40 mounted on the breaker strip 26 at the side of the door, also shown in Fig. 1. Within the insulated walls of the cabinet is provided a control switch 41 having an operating rod 42 extending toward a recess 43 formed in the strike 40. The switch 41 is mounted on a bracket 44 which is welded or otherwise suitably secured to the outer shell 21. The operating rod 42 is engaged by the bolt 39 when the door is closed and maintains the lamp 15 inactive. However, as soon as the bolt 39 moves away from the rod 42, the switch 41 operates to energize the lamp so that the lamp begins to operate before the bolt 39 is drawn out of the recess 43. It will, therefore, be understood that the lamp will be energized before the door can be opened and will be in operation when the door is opened.

One example of a circuit suitable for controlling the lamp 15 is illustrated in Fig. 6. The lamp 15, as shown in Fig. 6, includes a sealed envelope 45 of suitable material transparent to ultraviolet rays and is provided with cathodes 46 and 47 at either end thereof. These cathodes are made of tungsten or other suitable material which may be heated to incandescence by the passage of an electric current. The lamp 15 is connected across a source of alternating current 48 through a current limiting reactor or ballast 49. The envelope 45 contains mercury vapor under low pressure; however, the voltage of the supply 48 is insufficient to produce a discharge between the cathodes 46 and 47, and it is necessary to provide some means for starting the lamp. The lamp may be started by first heating the cathodes 46 and 47 to produce ionization and then impressing a high voltage between the cathodes to start the discharge. Thereafter the voltage of the line 48 is sufficient to maintain the lamp in operation. In order that the lamp may be started in the shortest possible time, it is desirable to maintain the cathodes 46 and 47 in a heated condition. A heating circuit through the cathodes 46 and 47 is completed through the switch 41 when it is held closed by the bolt 39, and through a current limiting reactor 50. When the switch 41 is opened by the withdrawal of the bolt 39, a high voltage kick is produced by the interruption of the current flowing through the reactor 49 and the lamp is started. The lamp is thereafter maintained in operation by the voltage across the lines 48. When the switch 41 is again closed upon closing of the door 12, the voltage between the cathodes 46 and 47 is reduced and the glow discharge extinguished. The reactor 50 limits the current employed for heating the cathodes 46 and 47 when the lamp is not in operation. The component parts of the circuit shown in Fig. 6, including the reactors 49 and 50 are, of course, located outside the food compartment 11 in order to prevent the generation of heat in the compartment.

The germicidal efficiency of an ultraviolet lamp such as that illustrated increases toward a maximum with an increase in the temperature of the lamp and increases for a short period of time after initial starting of the lamp. It is, therefore, desirable to start the lamp as soon as possible and have the temperature of the lamp as high as possible before starting. It is, therefore, apparent that the arrangement of a circuit such as that shown in Fig. 6 together with the structural arrangements for maintaining the lamp out of contact with the cool air in the food compartment insures a high degree of bactericidal effectiveness of the lamp when the door is opened.

While I have shown my invention in connection with a domestic refrigerator, other applications will readily be apparent to those skilled in the art. I do not, therefore, desire my invention to be limited to the particular construction shown and described, and I intend by the appended claims to cover all modifications within the spirit and scope of my invention.

What I claim as new and desire to secure by Letters Patent of the United States is:

1. A refrigerator including a thermally insulated cabinet provided with a food storage compartment having a door opening, a door for closing said opening, means including a refrigerating machine for cooling the air within said compartment to minimize the growth of bacteria therein, means arranged outside said compartment adjacent said opening for projecting a screen of ultraviolet rays across said door opening, and means arranged to be actuated upon the opening of said door for energizing said last mentioned means and for maintaining said screen of ultraviolet radiation while said door is open to kill bacteria in air entering said compartment.

2. A refrigerator including a thermally insulated cabinet provided with a food storage compartment having a door opening, a door for closing said opening, means including a refrigerating machine for cooling the air within said compartment to minimize the growth of bacteria therein, said cabinet being provided with a recess outside said food compartment and adjacent said door opening, means including an ultraviolet lamp arranged within said recess for projecting a screen of ultraviolet radiation across said door opening and means arranged to energize said lamp when said door is opened to produce said screen of radiation and for maintaining said lamp energized while said door is open to kill bacteria in air entering said compartment.

3. A refrigerator including a cabinet constructed of inner and outer metal shells having thermal insulation arranged therebetween, said inner shell providing a food storage compartment having a door opening and said shells being spaced apart about said door opening, breaker strips of insulating material connecting said shells about said door opening on three sides thereof, means including a light reflector for closing the space between said shells on the fourth side of said opening, means including an ultraviolet lamp arranged adjacent said reflector for projecting a screen of ultraviolet radiation across said door opening, and means arranged to be actuated upon the opening of said door for energizing said lamp to produce said screen of radiation and for maintaining said lamp energized while said door is open to kill bacteria in air entering said compartment.

4. A refrigerator including a thermally insulated cabinet provided with a food storage compartment having a door opening, a door for closing said opening, means including a refrigerating machine for cooling the air within said compartment to minimize the growth of bacteria therein, means arranged outside said compartment adjacent said opening for projecting a screen of ultraviolet rays across said door opening, means arranged to be actuated upon the opening of said door for energizing said last mentioned means and for maintaining said screen of ultraviolet radiation while said door is open to kill bacteria in air entering said compartment, and means for minimizing direct radiation of ultraviolet light from said projecting means toward the outside of said refrigerator.

5. A refrigerator including a thermally insulated cabinet provided with a food storage compartment having a door opening, a door for closing said opening, means including a refrigerating machine for cooling the air within said compartment to minimize the growth of bacteria therein, said cabinet being provided with a deep recess outside said food compartment and adjacent said door opening, means including an ultraviolet lamp arranged within said recess remote from said door opening, said recess being sufficiently deep to prevent any substantial direct radiation from said lamp to the outside of said compartment, and means arranged to be actuated upon opening said door for energizing said lamp to produce said screen of radiation and for maintaining said lamp energized while said door is open to kill bacteria in air entering said compartment.

6. A refrigerator including a thermally insulated cabinet provided with a food storage compartment having a door opening, a door for closing said opening, means including a refrigerating machine for cooling the air within said compartment to minimize the growth of bacteria therein, means arranged outside said compartment adjacent said opening for projecting a screen of ultraviolet rays across said door opening, a door latch and an operating mechanism therefor, and means for energizing said ray projecting means upon operation of said latch mechanism and prior to the opening of said door.

7. A refrigerator including a thermally insulated cabinet provided with a food storage compartment having a door opening, a door for closing said opening, means including a refrigerating machine for cooling the air within said compartment to minimize the growth of bacteria therein, said cabinet being provided with a recess outside said food compartment and adjacent said door opening, means including an ultraviolet lamp arranged within said recess for projecting a screen of ultraviolet radiation across said door opening, a latch mechanism for said door having an operating handle, and means dependent upon initial movement of said latch mechanism for energizing said ultraviolet lamp before said door is released by said latch mechanism whereby said screen of radiation is projected across said door opening instantaneously upon the opening of said door.

8. A refrigerator including a thermally insulated cabinet provided with a food storage compartment having a door opening, a door for closing said opening, means including a refrigerating machine for cooling the air within said compartment to minimize the growth of bacteria therein, said cabinet being provided with a recess outside said food compartment and adjacent said door opening, means including an ultraviolet lamp arranged within said recess for projecting a screen of ultraviolet radiation across said door opening, said lamp including a sealed envelope having spaced cathodes therein, means for maintaining said cathodes heated while said lamp is not in operation, and means arranged to be actuated upon the opening of said door for energizing said lamp to produce said screen of radiation and for maintaining said lamp energized while said door is open to kill bacteria in air entering said compartment.

MATTHEW LUCKIESH.